Patented Feb. 10, 1931

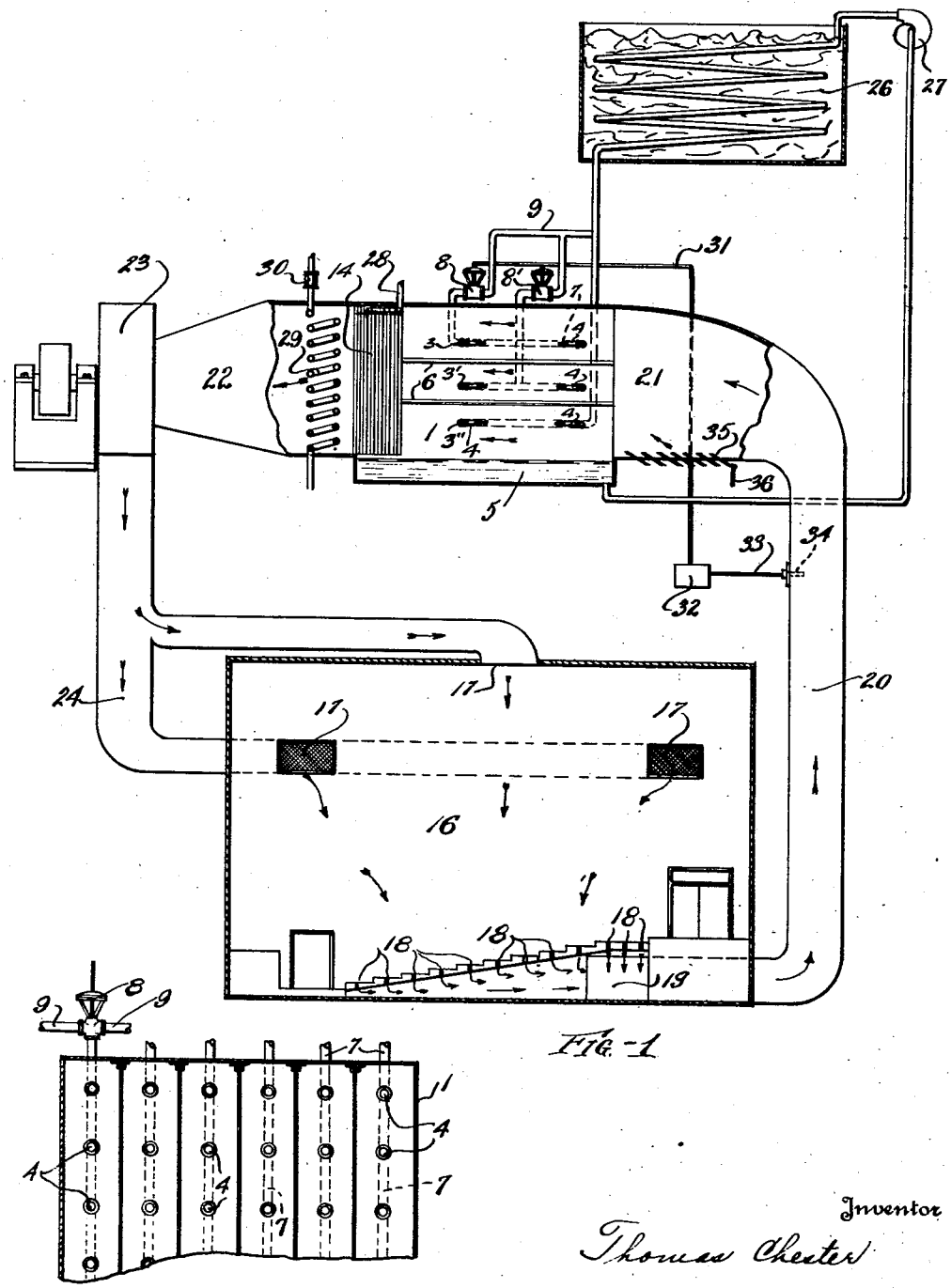

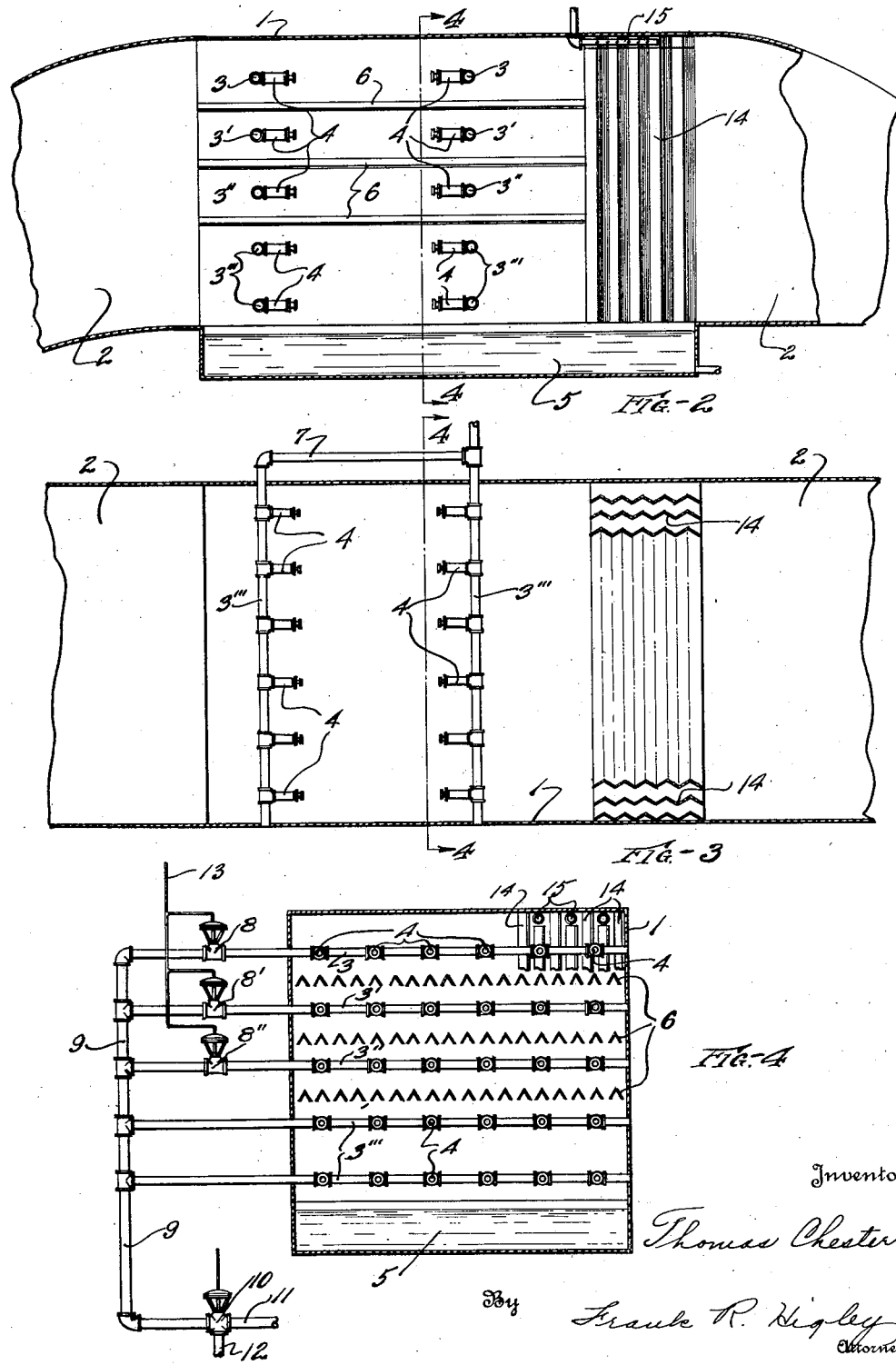

1,791,751

UNITED STATES PATENT OFFICE

THOMAS CHESTER, OF PITTSBURGH, PENNSYLVANIA

DEHUMIDIFIER AND APPARATUS FOR AIR TREATING

Application filed January 30, 1928. Serial No. 250,489.

This invention relates to air conditioning and ventilating systems such as those employed for the purpose of artificially maintaining predetermined atmospheric conditions in enclosure structures such as auditoriums and work rooms in certain industries; and more particularly the invention relates to the air washer which forms a part of such system, being used either as a dehumidifier or humidifier, and to the arrangement of the parts therein whereby a new method of air conditioning results.

An air conditioning system of the type to which reference is made usually embraces a ventilating circuit whereby air is circulated, and means for conditioning the circulated air, including temperature and humidity control thereof, and a scrubber or eliminator for removing particles of impurities suspended therein and also the entrained drops of water.

For the purpose therefor of establishing and maintaining the desired relative humidity, the air is first passed through an air washer which conveniently forms a part of the so-called dehumidifier and conveniently takes the form of a casing having a mist chamber, inserted in the passage through which the circulating air flows. By this the air is brought approximately to the saturation or dew point at the mist chamber temperature. The temperature of the air may in fact be either raised or lowered by its passage through the mist chamber by proper control of the mist temperature. Thus in the summer months, the water supply from which the mist is formed may be cooled by refrigerating means so that the dew point of the circulated air is lowered and the air thus dehumidified; and in winter the water may be heated before the mist is formed therefrom, and the air therefor in fact humidified.

The air is next passed through the scrubber and eliminator which conveniently comprises a baffle arrangement, which may have its forward or scrubber portion maintained surfaced with running water, and its rearward portion dry, so that entrained particles of impurities and drops of water are entrapped by the baffles and carried off by the water thereon. Such usual type of scrubber does not materially affect the temperature or humidity of air passing therethrough. It is usually preferable to install the scrubber ahead of the eliminator instead of after the same, but in either arrangement it is customary to locate the washer, scrubber and eliminator which comprises the dehumidifier unit, together or adjacent for the purpose of simplifying the piping required.

These steps may be followed by subjecting the air to heating means such as passage thereof over a heating coil, either at this point or subsequently by which the relative humidity is adjusted to the desired amount as the desired temperature is attained, provided the proper saturation temperature has been imparted in the mist chamber.

For purposes of ventilation some fresh or outside air must usually be added to freshen the vitiated air in the enclosure structure, a part of which used air is usually recirculated and owing to the operating expenses involved it is occasionally the practice in the art to pass only the fresh air through the mist chamber and scrubber, bypassing these parts of the system by the recirculated air.

According to my invention I provide a novel form of air washer by the use of which I am able to arrange a single passage for the circulating air so that all of the circulated air passes through the dehumidifier, but only the necessary part thereof is subjected to mist therein.

More particularly my air washer embraces the provisions of means whereby the mist chamber thereof is divided into zones, means being provided for independently controlling the mist in the several zones whereby the dehumidifier may be rendered inoperative through selected portions thereof while still allowing free passage of air therethrough; so that in effect, the chamber may be divided into two zones of variable relative sectional dimension, one portion of the passage therethrough being filled with mist and the other free therefrom.

Thus the dehumidifying action may be concentrated upon that portion of the stream passed through the mist, so that less sensible heat is removed from the total volume of air circulated; so that refrigerating effect is concentrated on the water vapor in the air, to remove latent heat and sensible heat from the selected portion thereof, rather than latent heat and sensible heat from the entire stream. In this way all the dehumidification is effected in the reduced quantity or volume of air passed through the mist, which may be recirculated air, fresh air, or a mixture of both. Hence by the use of my dehumidifier arrangement I am able to condition air in a more economical manner and with considerably less installation expense than has heretofore been possible in the art.

The exact nature of my invention will be more apparent from the following description taken in connection with the following drawings in which Fig. 1 is a diagrammatic view of an air conditioning system set up for operation according to my method; Figs. 2 and 3 are respectively vertical and horizontal sections of a form of my dehumidifier showing the washer, scrubber and eliminator portions thereof; Fig. 4 is a transverse section as in the planes of lines 4—4 of Figs. 2 and 3, and Fig. 5 is a section corresponding to that of Fig. 4 but showing an optional form of washer arrangement.

With reference now particularly to Figs. 2 to 4 the dehumidifier has a casing 1 of rectangular section adapted to form a section of a conduit 2 through which the air to be conditioned is circulated. Within the casing are a number of transversely and preferably vertically spaced horizontal headers, 3, 3′, 3″ etc., each carrying spaced at intervals therealong a number of atomizing nozzles 4 which are preferably of self-flushing type as fully disclosed in my Patent No. 1,628,823, of May 17, 1927. Preferably two banks of headers are provided and the nozzles thereon turned inwardly toward each other as indicated, whereby a mist may be set up between the two banks of nozzles thus formed.

The casing 1 opens downwardly into a settling basin or tank 5 in the customary manner.

The two headers 3 at each elevation are connected as by a pipe 7 and according to my invention those headers in the corresponding zones are arranged to be controlled each by diaphragm valves 8, 8′ and 8″. The valves 8 are of well known construction wherein water flow is controlled by air pressure acting upon a diaphragm, in opposition to adjustable spring means so as to close the water passage as air pressure is increased; and the valves need differ from each other only in that the spring which opposes the action of the diaphragm of the upper valve 8 controlling the upper pair of headers 3 is weaker than the spring of the diaphragm valve 8′ controlling the second pair of headers 3′; and similarly the spring of the valve 8″ controlling the third pair of headers 3″ is stronger than the resistance springs of either of the valves 8 or 8′. A supply line 9 has communication with all of the valves 8 as indicated, Fig. 4; and where the spray water is to be heated as in winter service the line 9 may be arranged subject to the control of the valve 10 having a water connection 11 and steam connection 12 and automatically governed to control the temperature supplied through the line 9, as will be well understood by one familiar with the art. The diaphragms of the valves 8 are subject to air pressure in the common air line 13.

With the arrangement described it will be apparent that as air pressure is released into the line 13 the three valves, 8, 8′, 8″ will be closed with a relay action. That is the valve 8 will be first closed and the valve 8″ last closed as the air pressure to which the three diaphragms are subjected is increased, so that mist will be cut out of the upper three zones of the dehumidifier in succession downwards, and re-established in succession upwards, or in effect, the casing 1 may be divided into opposed dry and wet zones of variable relative sectional areas.

I preferably provide horizontal partitioning means between the several zones as established by the upper sets of nozzles, the partitioning means being preferably in the form of longitudinally arranged members 6 of inverted V section as indicated, Fig. 4, adjacent members being slightly spaced from each other to allow drainage downward therebetween, and all of the members being removable as for cleaning and for affording easy access to the atomizing nozzles.

Above the rear extremity of the tank 5 in the direction of flow is arranged the scrubber and eliminator which is in the form of a number of vertically disposed zigzag baffle plates 14 spaced to provide generally longitudinal but tortuous air passages between them, perforated distributor pipes 15 or alternately flooding nozzles being arranged adjacent the upper extremities of the forward portions of baffle plates to maintain a flow of water down the forward portions of the faces of the plates. It will thus be seen that all of the air flowing through the conduit 2 will pass through the mist chamber, the scrubber and the eliminator, although the condition of only a portion of air may be affected by the dehumidifier.

With reference now to Fig. 1, 16 is a diagrammatic showing of an auditorium building illustrative of an enclosure structure the air in which is to be conditioned. Air supply inlets 17 are approximately arranged as in the walls and ceiling, and air extraction outlets 18 as in the floor thereof and leading to a master outlet 19. A dehumidifier indicated at 1 is provided and arrangement made to circulate air from the outlet 19 through the conduit 20 which has a suction chamber 21 communicating with the dehumidifier, thence by way of the conduit portion 22, through the blower 23, conduit 24, to the inlets 17. Circulation is thus maintained in the system as indicated by the arrows. The dehumidifier indicated is provided with three zones the upper two of which are controlled as by the valves 8, 8', which in the assembly chosen are supplied by water cooled in a refrigerating system indicated conventionally as at 26, circulation from the tank 5 through the refrigerator means 26 and the dehumidifier being maintained by a pump 27. Scrubber baffle plates 14 are provided as indicated, supplied with water as from the pipe 28. Beyond the eliminator in the direction of flow is a heating coil 29 controlled by a valve 30. The diaphragms of the valves 8 and 8' are arranged for control through an air line 31 the compressed air supply to which is controlled by a relay 32 which in turn has connection as by small compressed air pipe 33 with a hygrostat 34 in the path of the return air. The spring of the valve 8 is formed or adjusted to be of less strength than that of the valve 8', whereby valve 8' will close only after closing the valve 8.

Operation of the system will be apparent. The blower 23 maintains the air circulation indicated, and according to the humidity of the air in the return conduit 20 the upper portion of the dehumidifier will be operative or inoperative upon the air passing therethrough, with the relay action already described. However, all of the air circulated will be cleaned by the scrubber; so that the circulated air is dehumidified only as necessary, and cleansed, all without divergence or deviation of the stream so far as the dehumidifying and scrubbing elements are concerned.

In most installations and under most conditions sufficient fresh air will enter the enclosure structure from the outside atmosphere by infiltrations, through doors, windows, crevices, etc., to maintain a suitable standard of purity in the system.

However, a louver damper 35 may be arranged in the wall of the suction chamber 21 adjacent the lowermost zone of the dehumidifier, the damper being shown in open position, wherein outside air which enters therethrough is admitted to the recirculated air current. The damper is controlled by a connection 36 which may be arranged either for hand or automatic operation as will be understood. The damper 35 is preferably so arranged as indicated that such outside air as is introduced into the system passes through the lowermost portion of the dehumidifier which is always effective for dehumidifying action, and this air is therefore conditioned as well as scrubbed.

Similarly the surplus part of return air may be vented to the atmosphere through the various leakage crevices, or through a duct provided for this specific purpose.

The net result is therefore, that while a conditioned air supply is always had in the room, and this supply is always free from solid impurities, yet only the least necessary refrigerated water is used by the dehumidifier. Most of the fresh air introduced into the system is properly conditioned on its first pass through the dehumidifier and the cooperating apparatus of the system; the recirculated air being dehumidified only when necessary.

Fig. 5 shows an alternate arrangement wherein the humidifier is divided by vertical partitions into vertically disposed zones, the atomizing nozzles being transversely spaced as before, but here horizontally so instead of vertically. In such case, since no drainage through the partitions is necessary the partitions may be solid but should be removable. Partitions employed according to my invention are removably secured in any convenient manner in the dehumidifier, whereby a standard dehumidifier may by the insertion of partitions and the addition of the graduated valves 8, 8' 8'' be converted for use according to my method, at very little expense.

While for simplicity of illustration, I have shown and described a dehumidifier divisible by a relatively small number of zoning means, it will be apparent that any number of divisions may be provided within the scope of my invention. For example each atomizing nozzle could if desired be arranged for independent control by a corresponding diaphragm valve, and both vertical and horizontal partitioning means suitably arranged according to the nozzle and valve arrangement.

While the valves 8 have been described as graduated by differentiation of the strength of the springs therein, it will be obvious that the same effect could be attained by employing springs of similar strength in each thereof and differentiating the diaphragm areas to obtain the desired progressive closing and opening action.

What I claim is:

1. In a dehumidifier having a chamber adapted for passage of air therethrough, a plurality of atomizing means arranged in transversely spaced relation in said chamber to form a mist therein, valve means associated with certain of said atomizing means according to the location thereof, and control means associated with said valve means to actuate the same in progressive order whereby said chamber may be divided into adjacent passage zones of variable relative sectional area, one of said zones free of mist, and the other filled with mist.

2. In a dehumidifier having a chamber adapted for passage of air therethrough, a plurality of atomizing means arranged in spaced relation in said chamber to form a mist therein, a plurality of valve means associated with certain of said atomizing means according to the location thereof, each valve having a spring-balanced diaphragm arranged to control the same, the diaphragms being arranged subject to a common control pressure but the springs thereof being of differing strengths dependent on the location of the corresponding atomizing means, whereby said valves are actuated in progressive order to effect a passage zone in said chamber, of variable sectional area and free of mist.

3. In a dehumidifier having a chamber adapted for passage of air therethrough, a plurality of transversely spaced atomizing means adapted to effect a mist in said chamber, and automatic control means associated with said atomizing means to render the same operative or inoperative progressively to effect a zone of variable sectional area in said chamber, through which zone a corresponding portion of said air may pass without contact with mist.

4. In a dehumidifier having a chamber adapted for passage of air therethrough, a plurality of atomizing devices arranged to effect mist in transversely spaced portions of said chamber, and automatic control means associated with one of said atomizing devices to render the same operative or inoperative independent of another thereof, whereby the chamber will have a mist-containing zone, and another automatically controlled zone which may or may not have mist, dependent upon said control means.

5. In a dehumidifier having a chamber adapted for passage of air therethrough, a plurality of atomizing devices arranged to effect mist in transversely spaced portions of said chamber, automatic control means associated with one of said atomizing devices to render the same operative or inoperative independent of another thereof, whereby the chamber will have a mist-containing zone and another automatically controlled zone which may or may not have mist, dependent upon said control means, and partitioning means longitudinally extending in said chamber between said zones.

Signed by me, this 16th day of January, 1928.

THOMAS CHESTER.